Oct. 31, 1967 R. D. HEIN 3,349,418
LOW FRICTION STRUCTURAL BEARING
Filed July 20, 1965

INVENTOR
RICHARD D. HEIN
BY *Frank J. Earheart*
*James A. Lucas*
ATTORNEYS

United States Patent Office 3,349,418
Patented Oct. 31, 1967

3,349,418
LOW FRICTION STRUCTURAL BEARING
Richard D. Hein, Wabash, Ind., assignor to The General Tire & Rubber Company, a corporation of Ohio
Filed July 20, 1965, Ser. No. 473,468
9 Claims. (Cl. 14—16)

ABSTRACT OF THE DISCLOSURE

An elastomeric bearing pad, applicable for use on bridges or the like, is provided with a low friction surface composed of a polymeric material such as Teflon. A rigid back-up plate is embedded in the elastomer to support and prevent cracking of the polymeric material when the pad is subject to compressive loads.

Description of the invention

This invention relates to a bearing of the type commonly used in structural applications wherein it is necessary or desirable to permit relative movement between two members of the structure. More specifically, the invention relates to an elastomeric structural bearing provided with a low friction sliding surface reinforced with a rigid back-up plate, the bearing being used to separate structural members such as I-beams and piers from one another.

In the construction of a large structure such as a building or a bridge, one factor which must be taken into consideration is the movement of the individual structural members relative to one another. This movement can be due to a number of factors such as the thermal characteristics of the materials being used, the external forces such as wind, etc. on the structure, and the static and dynamic loads applied to the members themselves. In a bridge structure, horizontal beams are suspended between spaced vertical supports, the ends of the beam terminating at the supports. It is necessary, in such an application, that provision be made for the thermal expansion and contraction of each beam as well as angular and rotational movement caused by traffic on the bridge, etc.

It has been a common practice in the past to utilize some kind of a cushioning and support device between the beam and the vertical structural member. Examples of such devices are rollers or pin bearings, pads made of various materials such as wood, bronze, or other metals, and pads made of elastomeric materials such as rubber. Typically, one of these devices is placed on top of the vertical structural member or on a suitable ledge thereof, after which the end of the beam is positioned on the device. Thereafter, as the beam undergoes movement toward or away from the vertical support member, it rolls or slides over the cushioning device; or in the case of an elastomeric pad, its movement is accommodated by shear deformation of the elastomer.

These various prior art devices have all had shortcomings which have prevented their standardization, thereby resulting in a continuing search for more improved structural bearings. For example, some of them, because of their design or the materials used in their fabrication, were incapable of accommodating heavy loads. Others were provided with a lubricant at the sliding surface; however, the lubricant would eventually dry up resulting in increased frictional resistance followed by spalling and eventual failure of the devices. Because of the difficulty and expense of replacing these cushioning devices, they have proved to be unsatisfactory for many applications.

It is an object of this invention to overcome these prior difficulties by the use of a structural bearing which is simple in construction, maintenance-free, and easy to install.

It is another object to provide a bearing comprising one or more elastomeric pads, each having a low friction sliding surface backed up by a reinforcing stress-distribution plate, said bearing adapted to absorb angular and linear movement as well as vibrations.

Yet another object is the provision of one or more bearing pads for use between a pair of structural members, each pad comprising a low friction sliding surface, a rigid reinforcing means supporting said sliding surface, and a deformable elastomeric material interposed between the reinforcing means and one of said structural members.

These and other objects are accomplished through the use of a bearing constructed in accordance with the following description and figures in which.

In its broadest aspect, this invention relates to a structural bearing composed of one or more bearing pads positioned between two structural members. Each pad is composed of an elastomeric body portion, one low friction surface, preferably composed of a hard polymeric material, and a reinforcing plate underlying said low friction surface and preferably embedded in the elastomer.

Figure 1:
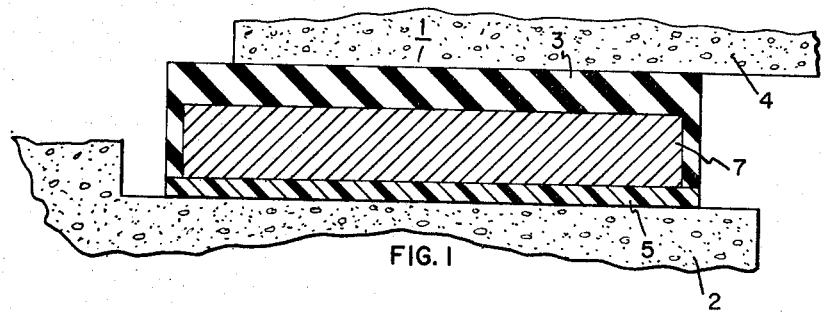
FIGURE 1 shows a cross section of a bearing consisting of a singular pad interposed between two structural members.

Referring now to FIGURE 1, there is shown in its simplest form a bearing pad 1 of generally flat rectangular shape positioned between a pair of structural members 2, 4. The pad consists of an elastomeric portion 3, a low friction surface 5, and a reinforcing member 7 interposed between said elastomeric portion and said low friction surface. One surface of the reinforcing member 7, preferably comprising a metal plate, is in contact with, and is desirably attached to, said low friction surface 5. The other five sides of the plate 7 are preferably embedded in the elastomeric portion 3 which serves to protect the reinforcing plate from corrosion.

Figure 2:
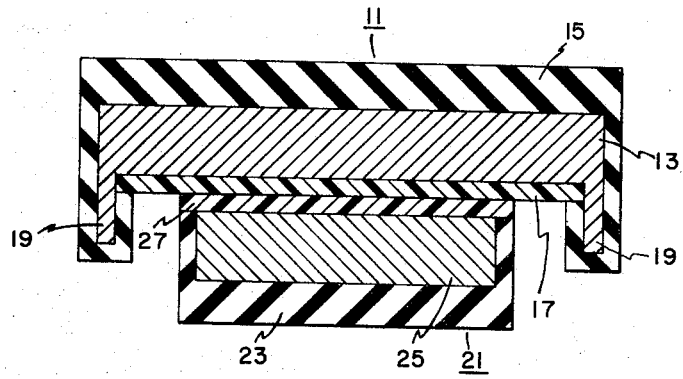
FIGURE 2 is a cross section of one modification of this bearing showing two pads in sliding contact with one another, provision being made for limiting the amount of their relative sliding movement.

The bearing shown in FIGURE 2 differs from that shown in FIGURE 1 in that it consists of two bearing pads contacting one another along their respective low friction surfaces. The bearing consists of an upper pad 11 having substantially larger linear dimensions than the lower pad 21. The upper pad is composed of a layer of low friction material 17 bonded to one surface of a back-up plate 13 which in turn is embedded in a deformable elastomer 15 such as neoprene. The bottom pad 21 is somewhat similar in construction to the pad shown in FIGURE 1 and comprises a deformable elastomer 23, a reinforcing plate 25, and a low friction layer 27. This bottom pad is adapted to rest upon a horizontally disposed ledge or the top surface of a vertical structural support member. Another structural member, such as an I-beam, rests on top of the upper pad 11. Relative movement of the two structural materials in a horizontal direction is transmitted through the two pads 11 and 21 to the contiguous low friction surfaces thereof causing the two pads to slide over one another. This relative movement is limited by the downwardly extending legs 19 of the reinforcing plate 13 of pad 11. As shown, these legs are located on two sides of the top pad 11. However, the pad can be designed so that the legs extend down on all four sides, thereby limiting the relative horizontal movement in all directions.

Figure 3:
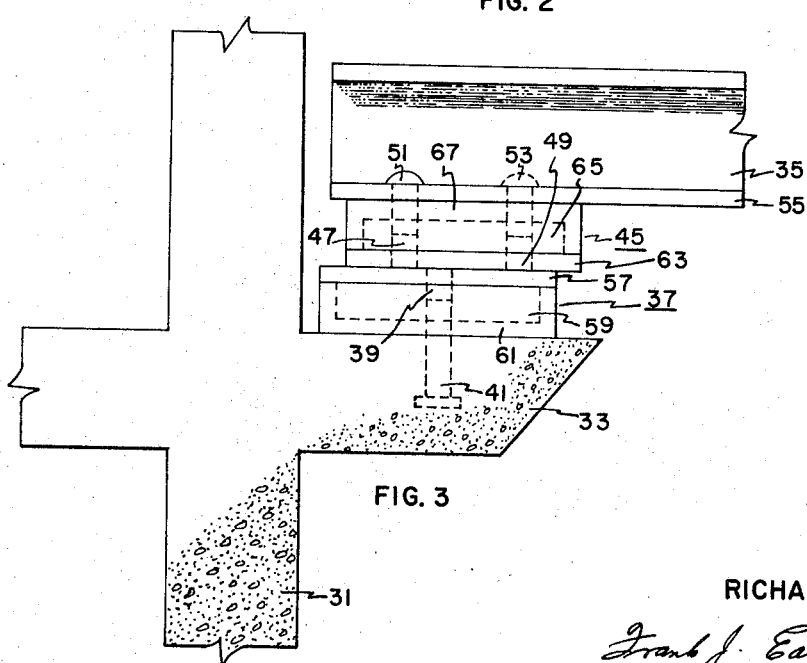
FIGURE 3 shows the use of two pads of the type shown in FIGURE 1 positioned on a ledge of a vertical support member and supporting the end of an I-beam.

Referring now to FIGURE 3, there is shown a vertical structural member 31, such as concrete provided with a ledge 33 integrally formed thereon. It should be understood, of course, that the vertical member can be of any suitable material, not necessarily concrete, and that the ledge 33 can take the form of a flange bolted, riveted, or otherwise attached to the member. The ledge is adapted to receive an end of a horizontally disposed structural member such as I-beam 35. Disposed between the ledge 33 and I-beam 35 is a bearing composed of two bearing pads of the type shown in FIGURE 1. The lower bearing pad 37 is provided with a hole 39 therethrough adapted to receive a bolt 41 embedded in the concrete. The bolt serves to center the pad and to prevent it from sliding on the ledge 33. The upper bearing pad is shown with two holes 47 and 49 adapted to receive two rivets or bolts 51, 53 extending through the bottom flange 55 of the I-beam 35 to position the pad centrally in the proper location in relation to the I-beam.

The lower pad 37 is provided with an upper layer 57 of low friction material, a reinforcing plate 59 supporting said layer, and an elastomeric body portion 61 in which the plate is embedded. In like manner, the upper pad 45 has a low friction layer 63 in sliding contact with the similar layer 57 of the bottom pad. Plate 65 backs up the layer of low friction material and is in turn embedded in a body 67 of elastomeric material.

As the I-beam 35 undergoes horizontal movement, such as that caused by thermal expansion and contraction of the beam, its movement toward and away from the vertical support 31 is transmitted to the upper pad 45 which slides back and forth on said lower pad 37. Said sliding is facilitated by the fact that the low friction layers of the respective pads are in surface contact with one another. Angular deflection of the I-beam, such as that caused by bending moment loads applied to the top of the I-beam, is transmitted to the bearing pads causing compressive and/or shear deformation of the elastomeric body portions of the pads.

It was previously stated that the low friction surface of the bearing preferably comprises a layer of a polymeric material. Examples of such materials that can be used in the teachings of this invention are nylon, polyurethane, and other relatively hard polymers which possess the requisite properties of low frictional resistance, such as certain fluorocarbon polymers. Teflon, a polytetrafluorocarbon polymer, has been found to be particularly suitable in this type of application. This material has very satisfactory resistance to high loading pressures thereby permitting the structural members to be heavily loaded. Furthermore, Teflon readily slides over itself and other materials. This ability apparently is not diminished by contaminates which might work their way into the sliding interface in that the contaminants embed themselves in the surface without adversely affecting the friction characteristics thereof. A further advantage of this material is that, unlike most materials, it has a coefficient of static friction which is essentially the same as, rather than higher than, its coefficient of kinetic friction. Furthermore, its chemical resistance, as well as its resistance to environmental conditions, is quite good.

The elastomer portion of the bearing pad is preferably made from a material such as neoprene although there are other materials, such as natural rubber, which can also be used. Neoprene possess good resistance to weathering and ozonation, and in addition possess good flame resistance. This factor is particularly important in building applications wherein the structural materials must meet certain minimum specification regarding fire resistance. The purpose of the elastomer in the bearing is to dampen natural and induced vibrations, and to allow for flectural movement of one or both of the structural members. In addition, the elastomer compensates for irregularities in the surface of the steel beam or concrete structure against which it is placed, thus insuring uniform and equal stress distribution to the low friction surface of the bearing.

As previously stated, one of the purposes of the elastomeric portion of the bearing is to accommodate, through deformation of the same, various angular deflections, vibrations, and loads imposed upon the structural members. This is accomplished primarily thorugh compression and stress deformation of the elastomer itself. On the other hand, the low friction polymeric layer is relatively hard and uncompressible and cannot be readily deformed. Therefore, if it were attempted to bond the low friction layer directly to the elastomer, repeated deformation of the elastomer would eventually cause cracking and failure of the polymeric layer. For this reason a rigid back-up plate is interposed between the polymer layer and the elastomeric layer, the purpose of this plate being to evenly distribute the distortive pressure of the elastomer and to apply them uniformly to the low friction layer.

As previously mentioned, it is preferable to embed the plate in the elastomer, leaving one surface of the plate exposed so that it may be bonded or attached to the low friction layer. Where the plate is composed of steel or other metal which undergoes environmental corrosion, embedding the same in the elastomer serves to prevent corrosion of the plate. However, when the reinforcing plate is made from a non-corrosive metal or a non-metallic material, the edges of the plate may be left exposed to the atmosphere and do not have to be protectively embedded in rubber or the like.

The reinforcing plate can be attached or bonded to the elastomer and to the low friction layer in any number of ways. The bonding can be accomplished during the molding or curing operation, or can be effected by heat or a suitable adhesive. Furthermore, mechanical attaching means can be used for this purpose.

In addition to the use of locating holes and bolts as shown in FIGURE 3, there are a number of other ways of positioning the bearing pad or pads between relatively movable structural members. Generally, the weight of the end of an I-beam on the bearing pads is sufficient to maintain them in position. It can be appreciated that there exists a relatively high frictional coefficient between the comparatively rough surface of the structural member and the elastomeric portion of the bearing pad, as opposed to the relatively low coefficient existing at the interface between the contiguous low friction layers of opposing pads, or between the low frictional surface layer of one pad and the surface of the other structural member. Therefore, all of the sliding should take place at the low friction surface. However, it may be felt that, for various reasons, the elastomer should be attached to its adjacent structural member. This can be accomplished by bonding the elastomer directly to the member, utilizing a suitable adhesive or the like for that purpose; or alternatively, an additional plate can be bonded directly to the elastomer, which plate is in turn welded or bolted to the structural member.

Although the bearing pads as heretofore described have been depicted as being rectangular in shape, it should be understood that they may be round, oblong, or polygonal in shape, as dictated by various design parameters, load, and size factors, etc.

Although the prior discussion has described the use of the bearing of this invention in building and bridges, it should be understood that there are many other applications. For instance, bearings of this type can be used to support large machinery, columns, equipment such as tanks and the like, and extensive lengths of pipe. Its use in other applications is evident, particularly where thermal travel, vibration, and/or widely fluctuating loads are to be accommodated.

Further modifications and changes can be made in designs of the structure bearing without departing from the novel scope thereof which is delimited by the following claims, wherein I claim:

1. In a bridge having a structural beam resting upon a support, means for accommodating linear and angular travel of said beam relative to said support, said means comprising a first relatively flat rectangular bearing pad resting upon said support and a second similarly shaped bearing pad stacked upon said first bearing pad and supporting the end of said beam, the contacting faces of each of said bearing pads consisting of a layer of a low friction fluorocarbon polymeric material, the surface of each of said pads in contact with its adjacent structural member composed of a compressible elastomeric material, and each of said bearings having a rigid reinforcing plate interposed between, and secured to, said elastomeric material and said low friction polymeric material.

2. A bearing according to claim 1 wherein the fluorocarbon polymer is polytetrafluoroethylene.

3. A bearing according to claim 2 wherein said elastomeric portions of said pads are composed of neoprene.

4. A bearing according to claim 3 wherein said reinforcing plates are composed of steel.

5. A bearing according to claim 1 provided with means cooperatively engaging said adjacent structural member and locating the pad relative thereto.

6. A bearing pad adapted to accommodate movement between a pair of relatively movable structural members comprising:
 (a) a sliding surface comprised of a layer of polymeric fluorocarbon material,
 (b) an elastomeric body portion deformable under load, and
 (c) a reinforcing plate interposed between and bonded to said fluorocarbon layer and said elastomeric body portion to prevent cracking of said layer when a load is applied to said bearing pad to cause said body portion to deform.

7. A bearing for use between two structural members comprising a pair of stacked relatively movable bearing pads, each of said pads comprising a deformable elastomeric layer in contact with a portion of one of said structural members, a rigid reinforcing plate bonded to said elastomeric layer and a hard polymeric material, having a low friction surface, in turn, bonded to said plate, the low friction material of said pads in sliding contact with one another.

8. The bearing according to claim 7 wherein the hard polymeric material consists of polytetrafluoroethylene.

9. The bearing according to claim 7 further including means for limiting the sliding movement of one pad relative to the other.

References Cited

UNITED STATES PATENTS

| | | | |
|---|---|---|---|
| 2,896,941 | 7/1959 | Stump | 267—49 |
| 3,144,838 | 8/1964 | Shaver et al. | 105—366 |
| 3,167,308 | 1/1965 | Bernstein et al. | 308—238 X |
| 3,243,236 | 3/1966 | Graham | 14—16 X |

FOREIGN PATENTS 961,823  6/1964  Great Britain.

JACOB L. NACKENOFF, *Primary Examiner.*